Dec. 26, 1950        H. V. CONROY        2,535,484
DISPLAY AND ADVERTISING APPARATUS
Filed May 22, 1946        2 Sheets-Sheet 1
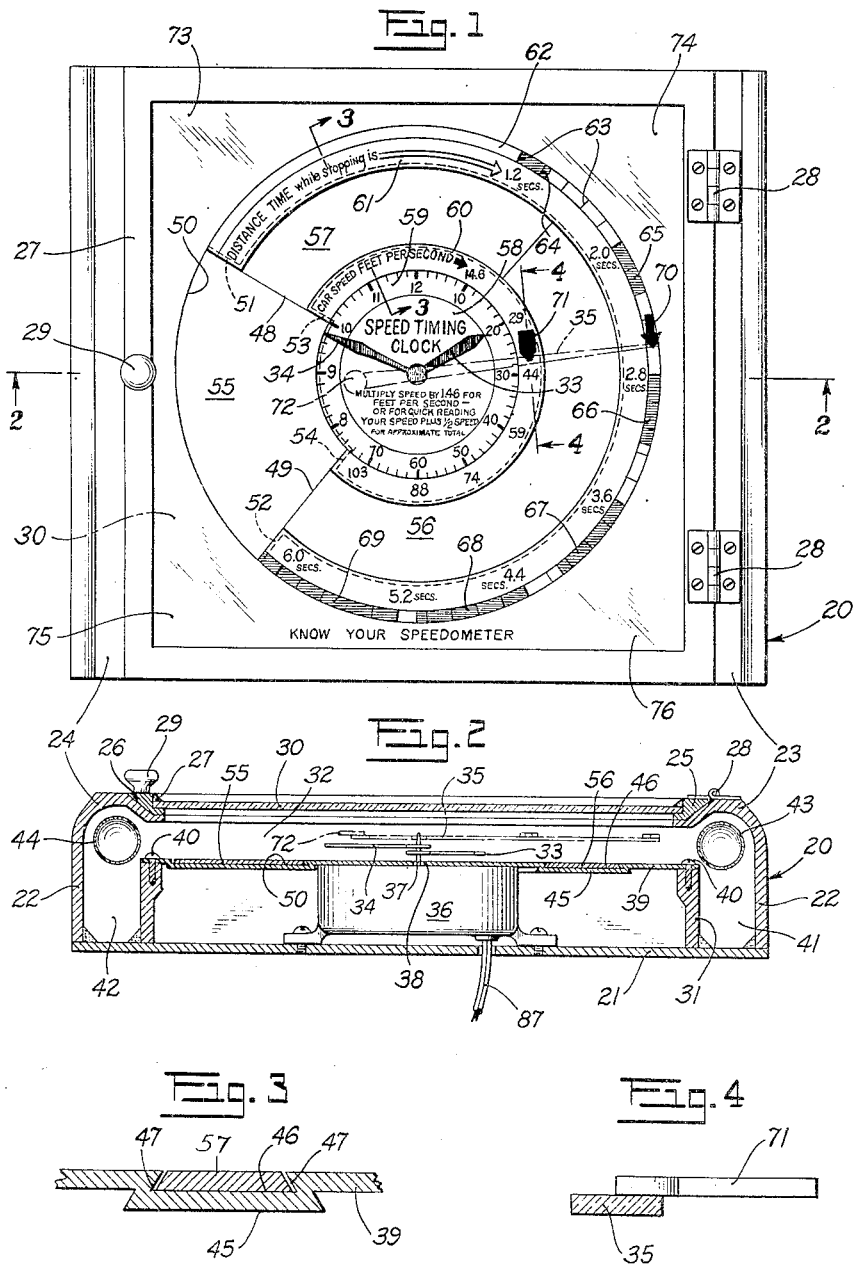
INVENTOR.
Hugh V. Conroy
BY
Howard E. Thompson
ATTORNEY Dec. 26, 1950 H. V. CONROY 2,535,484
DISPLAY AND ADVERTISING APPARATUS
Filed May 22, 1946 2 Sheets-Sheet 2
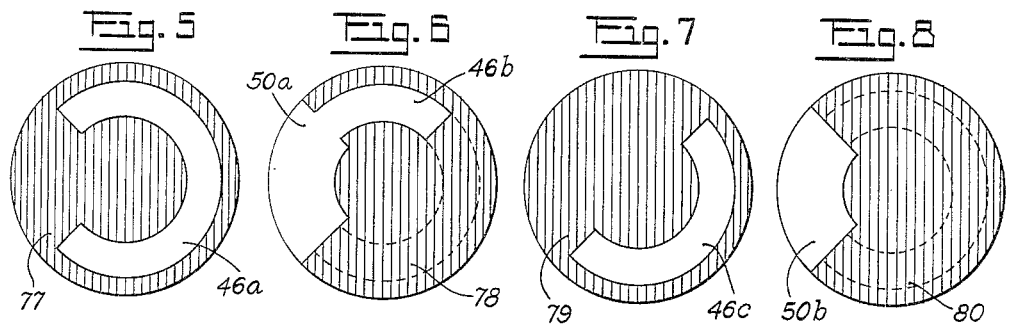
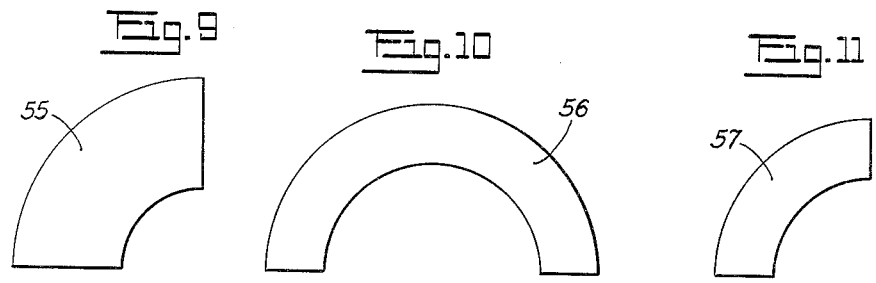
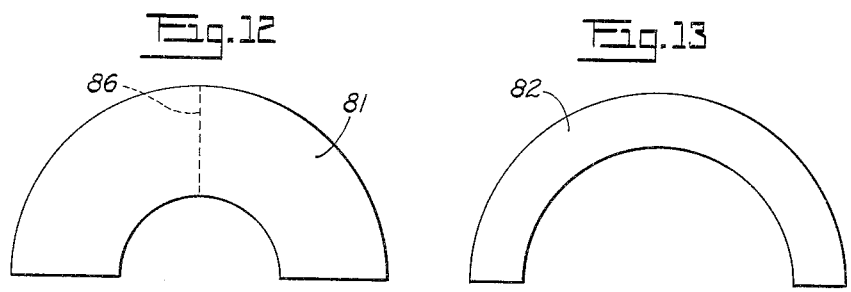
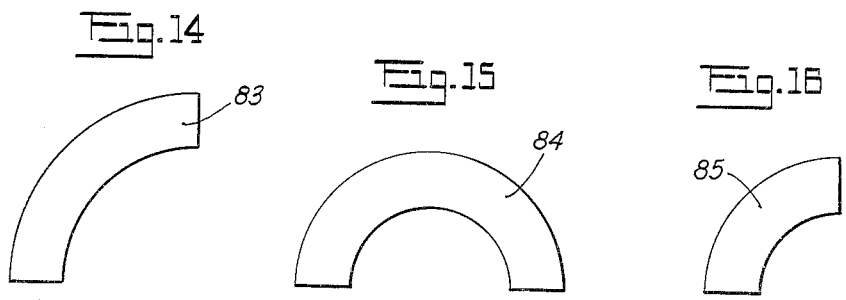
INVENTOR.
Hugh V. Conroy
BY
Howard E. Thompson
ATTORNEY Patented Dec. 26, 1950

2,535,484

UNITED STATES PATENT OFFICE 2,535,484

DISPLAY AND ADVERTISING APPARATUS

Hugh V. Conroy, New York, N. Y.

Application May 22, 1946, Serial No. 671,632

9 Claims. (Cl. 161—15)

This invention relates to apparatus involving a clock mechanism in conjunction with which is associated a display and advertising dial characterized to attract attention and to educate the public to a greater safety in operation of vehicles on streets and highways. More particularly, the invention deals with an apparatus of the character described wherein the display and advertising dial includes means in conjunction with which two elements actuated by the second hand of the timepiece operates to clearly designate to the observer the length of time required to stop the average vehicle when traveling at a predetermined miles per hour speed. Also the apparatus is adapted to indicate the number of feet travelled per second, at the rate of speed of travel of the car when brakes are applied, to bring the car to a stop. More particularly, the invention deals with apparatus of the kind under consideration incorporating a cabinet for illuminating the apparatus and particularly the dial thereof, as well as in the provision of means for detachably supporting characterized sheets or segments on the dial for advertising or other purposes. The novel features of the invention will be best understood from the following description when taken together with the accompanying drawings, in which certain embodiments of the invention are disclosed, and in which the separate parts are designated by suitable reference characters in each of the views, and in which:

Fig. 1 is a front view of an apparatus made according to my invention, diagrammatically illustrating one adaptation thereof.

Fig. 2 is a section on the line 2—2 of Fig. 1.

Fig. 3 is a section on the line 3—3 of Fig. 1, on an enlarged scale.

Fig. 4 is a section on the line 4—4 of Fig. 1, on an enlarged scale.

Figs. 5 to 8 inclusive show diagrammatically, dial faces with different arrangements of display or advertising sections thereon.

Figs. 9, 10 and 11 are face views of sheets or segments employed in producing the various dial arrangements shown in Figs. 1, and 5 to 8 inclusive.

Fig. 12 is a view similar to Fig. 9, but showing a half sheet or segment rather than a quarter sheet or segment.

Figs. 13 and 14 are views similar to Figs. 10 and 11, showing another form of sheet or segment; and Figs. 15 and 16 are views similar to Figs. 13 and 14 showing further types of sheets and segments.

The purpose of my invention is to utilize a clock, watch or similar timepiece, regardless of the size thereof, as a means for conveying to the observer of the timepiece, a predetermined message. Further, in conveying the message, it is the further purpose of my invention to utilize areas of the dial of the apparatus as an advertising medium wherein advertising medium devices, such for example, as sheets or segments are detachably mounted on the dial to occupy predetermined sections or areas thereof without interference with the message and at the same time, to bring to the public's attention any particular sales message or advertising literature. In most instances, this advertising message or literature will be associated with, or have a relationship to the store, establishment or other location in which the apparatus is to be displayed, whereas the public message may in fact, have no direct association or relationship to the location of the apparatus. For example, in conveying the message of "Know your speedometer" herein illustrated, to demonstrate one use of my invention, this may be applied to timepieces arranged in drug stores, grocery stores and other establishments, as well as in the more appropriate places, such as service stations, auto sales rooms and the like.

From the foregoing, it will appear that basically the invention deals with utilization of a conventional clock mechanism designating the time as a medium to convey general public information, as well as in bringing to public attention, predetermined advertising subject matter, the dial mechanism being so constructed as to facilitate many arrangements of advertising matter and inter-changing thereof from time to time.

While in many instances, the entire apparatus may simply comprise a clock or watch casing, in illustrating a more elaborate use of the invention, I have shown in Figs. 1 and 2 of the drawing an oblong rectangular casing 20 comprising a back wall 21, top, bottom and side walls generally identified by the reference character 22 in Fig. 2 of the drawing, these walls having at the sides of the casing inwardly extending flange portions 23 and 24, countersunk, as seen at 25 and 26. In the countersunk portion of the flanges 23 and 24 is seated a door or closure 27 hinged to the flange 23, as seen at 28, and having a knob or fingerpiece 29 at the opposite side thereof. The door 27 has a large transparent panel 30 to render the interior of the casing visible therethrough.

Supported upon the back wall 21 of the casing is a supplemental frame 31, the forward edge of which terminates short of, and in spaced relation to the door 27 and the inwardly extended flanges 23 and 24 to provide a large chamber 32 in which the hour hand 33, the minute hand 34 and the second hand 35 of a clock or watch mechanism 36 operates. The clock or watch mechanism 36 is supported upon the back wall 21 with the conventional hour, minute and second hand shafting 37 extending through an opening 38 in a dial or display plate 39.

The plate 39 may be of any desired form, and in the construction shown, is preferably rectangular and is secured to the forward edge of the supplemental frame 31 by suitable fastenings, as at 40. The frame 31 is disposed inwardly of the side walls of the casing to form chambers 41 and 42 which register with the chamber 32 and at the intersection of these chambers, suitable illuminating bulbs or tubes 43 and 44 are arranged, the same being shielded by the flanges 23 and 24, to prevent direct vision of these bulbs or tubes and yet to provide a flood of light into the chamber 32 to illuminate the outer face of the dial plate 39.

The dial plate 39 has a circumferentially depressed band portion 45 forming on the face of the dial plate 39, a curved recess 46 of dove-tailed or countersunk cross sectional contour, as seen by the bevelled walls 47, note Fig. 3 of the drawing. This recess or channel 46 extends from the radial 48 to the radial 49, note Fig. 1 of the drawing, and at these radial positions, the normal surfaces of the dial terminate in a quarter section extending between the radial positions 48 and 49 which is also depressed, forming the quarter section recess 50.

The terminate edges 51—52, as well as the edges 53—54 are also preferably undercut, somewhat similar to the undercuts 47 to retain a flexible sheet or segment 55 therein. The channel or recess 46 on the other hand is adapted for reception of one or more sheets or segments, such for example, as the sheets or segments 56 and 57, Figs. 10 and 11 of the drawing, the segment 55 being shown in Fig. 9.

In the present illustration of the invention, the center portion of the dial plate 39 has a disc like section 58 to which may be applied suitable reading or descriptive matter pertaining to the "Know your speedometer" display which is shown on the dial.

Marked on the dial plate 39 in any suitable manner around the disc 58, is an annular clock representation, as at 59, modified to the extent that numerals 10, 20, 30, 40, 50, 60 and 70 are employed, rather than the conventional numerals 1 to 7 inclusive, the numerals 10 to 70 indicating miles per hour travelled in a vehicle. Immediately outwardly of the annular clock band or section 59 is another band or section 60 beaded at the upper left hand end of the band with the insignia "Car speed—Feet per second" and associated with the numerals 10 to 70 inclusive are the numerals 14.6, 29, 44, 59, 74, 88 and 103 which are arbitrary figures indicating the number of feet per second travelled by a vehicle when operated at the different miles per hour travel indicated upon the dial band 59.

Beyond the recess 46 are two associated characterized bands 61 and 62, the inner band being beaded by the insignia "Distance time while stopping is," with an arrow extending to the first numeral 1.2, designating one and two-tenths seconds. The band 62 has marked thereon, as at 63, radial lines, designating the seconds between the clock band indication 10 and 70. On the band 62, over the radial marking 63, and covering the entire width of the band, are colored sections, as at 64, 65, 66, 67, 68 and 69. These colored sections indicate the time period of car travel before stopping can be effected. For example, adjacent the one and two-tenths seconds, the marking 64 covers a complete second section plus two-tenths of an adjacent section. In like manner, successive sections 65 to 69 indicated respectively, and as shown in the band 61, two-tenths second, two and eight-tenths seconds, three and six-tenths seconds, four and four-tenths seconds, five and two-tenths seconds and six seconds.

The hour and minute hands 33—34 are preferably of a dark color to be clearly visible, to at all times indicate the time of day. It is preferred, however, that the second hand 35 be of a transparent material or otherwise characterized to be at least semi-visible in its travel over the face of the clock, and mounted thereon are two indicating elements, for example, the arrow 70 adjacent the tip end of the hand and travelling over the field or band 60, and the element 71, which may be the representation of a vehicle and arranged on the hand 35 to travel over the field or band 60. In other words, the arrow 70 indicates distinctly the travelling over the marked sections 64—69, the actual time of travel of a vehicle in attempting to stop when the vehicle is travelling at the miles per hour indicated on the clock band 59 and the car representation 71 points to the number of feet per second the car is travelling when the brakes are applied.

Without a doubt, it is not generally known to the motorist or chauffeur or anyone operating a motor vehicle the number of feet per second a car is travelling at the different rate of speed. For example, it is hard to conceive that at seventy miles per hour you are travelling a hundred and three feet per second. However, in bringing this message clearly to the public, and the further message of the long time period required to bring a car to a stop when travelling at the different speeds, it will become more impressive to the motorists to travel at moderate rates of speed, particularly in congested or semi-congested areas. By providing the darkened characters or representations 70—71 moving over a light field, except for the markings 64—69, attention is immediately drawn to the distinct difference in the timepiece on the display. Having thus attracted attention in this manner, the individuals will then take a minute or two to study the display and to have it impressed upon them the time period required to bring a vehicle to a stop. The figures given in illustrating the present adaptation of my invention, particularly with respect to the marked sections 64 to 69 are arbitrary figures which have nevertheless been calculated from a series of tests with an average type of vehicle. It is, of course, to be understood with vehicles of different weights and motive power and with variances in braking capacity that these figures would vary slightly. It will, of course, be apparent that when the brakes are faulty, the time period of stopping a car will materially extend itself.

In constructing the second hand of plastic materials, preferably transparent material, the elements 70 and 71 may be of an opaque or substantially opaque plastic, simply cemented to the second hand 35, as is clearly indicated in Fig. 4 of the drawing. In order to attain the required balance, a weighted element, as at 72 is preferably secured to the other end of the second hand 35, as indicated in Fig. 1 of the drawing in order to maintain a smooth even travel of the second hand over the face of the dial. The marginal corner portions of the dial plate 39, as indicated at 73—74 and 75—76 in Fig. 1 of the drawing may in some instances be utilized for other instruction data, or as advertising display sections.

Turning now to Figures 5 to 8 inclusive, I have here diagrammatically illustrated the inner circular characterized portion of the dial, to demonstrate different arrangements of characterizations on the dial. In other words, in Fig. 5, the shaded sections 77 would represent everything appearing on the dial of Fig. 1, leaving only the channel 46a open for insertion of segments, such as 56 and 57.

In Fig. 6, the shaded area 78 leaves open part of the channel 46b for reception of the segment 57 and leaves the recess 50a open for reception of the segment 55.

In Fig. 7, the shaded section 79 leaves a channel 46c open for reception of the segment 56 alone. Whereas in Fig. 8, the shaded section 80 leaves open only the recess 50b for the reception of the segment 55.

These illustrations are to demonstrate the possible arrangements of the dial in providing different instruction characterized areas on the dial plate and different advertising areas thereon in which the segments 55, 56 and 57 are incorporated. In other words, these three segments will produce all the combinations, namely that shown in Fig. 1, as well as those illustrated in Figs. 5 to 8 inclusive.

In Figs. 12 to 16 inclusive, I have shown another series of segments 81, 82, 83, 84 and 85, the segment 81 in some instances may be divided centrally, in which event, it would be similar to the segment 55, the central division being indicated by the dotted line 86 of Fig. 12.

Considering Fig. 1, it will appear that the segment 55 fits a recess extending from the periphery of the circular portion of the dial to the outer edge of the clock band 59, whereas the recess 46 is disposed within and between the bands 60 and 61. The segment 81 as a half segment may thus be applied to a dial of the general type illustrated in Fig. 1 and constructed to receive the segment 81 to entirely block off everything on the dial except the clock band 59 between the time indication 10 or one o'clock and a point mid-way between seven and eight o'clock.

The segment 82 represents the outer half portion of the segment 81. In other words, the segment 82 in conjunction with 84 would produce a segment similar to the segment 81, and two pairs of the segments 82—84 or two of the segments 81 can completely cover the dial outwardly and around the clock band 59. The segment 83 represents one-half of segment 82, or a quarter segment, whereas segment 85 is one-half of segment 84 or an inner quarter segment. In other words, a combination of two segments 83 and two segments 85, would produce a segment 81 and doubling these combinations would produce a complete enclosure of the dial, as stated above. Each segment repeated in Figs. 9 to 16 inclusive can characterize an advertising display segment measured in terms of square inch or square foot space, depending upon the size of the clock mechanism employed.

While the dial plate 39 as shown in Figs. 1 and 2, does not provide the slidable or snap mounting of the segments shown in Figs. 12 to 16 inclusive, it will be apparent that dial plates constructed for this purpose can be provided. On the other hand another means for supporting the dial segments on the dial can be provided. As will appear in Figs. 2 and 3, the segments maintain a flush mounting with the outer surface of the dial, but this is not essential, as the segments may be simply pasted or otherwise secured to the face of the dial. In other words dummies could be mounted in the recess 46 and 50, and then the segments of Figs. 12 to 16 could be applied over the entire dial. It will also be understood that in some instances, and particularly where the instruction faces of the dial sheet are modified, the entire dial sheet may be removed by simply opening the casing, detaching the hour, minute and second hands, and replacing the dial plate, or a new dial plate may be simply applied over the dial plate 39. The latter procedure would be desirable at times in conveying a special message which might comprise a news item.

In the present construction, the clock mechanism 36 is of the electrical type and the electrical cords 87 of this mechanism extend into the casing 20 through the back wall 21.

From the standpoint of description, the second hand may be said to have long and short ends, the two elements 70 and 71 being arranged on the long end of the hand, and the counterbalance weight 72 on the short end, these ends being defined with respect to the axis of rotation of the hand. In referring also to the segments, they may be generally described as quarter or half segments, or sections and in a sense represent band sections in that they have a predetermined radial width. It must here be apparent that the present illustration of one adaptation of my invention has been built around the circular type of clock or timepiece. It is well known in the art, however, that square and oblong types of timepieces as well as oval timepieces have been used. In all instances, the other structural characteristics of the invention will be constructed to suit the different contours that may be employed.

Having fully described my invention, what I claim as new, and desire to secure by Letters Patent is:

1. A display apparatus comprising a casing having spaced front and back walls, a timepiece mechanism in the casing, a dial in the casing intermediate and spaced from said walls, said dial having a clock face portion, the timepiece having minute and hour hands movable over said clock face portion in designating time, a second hand actuated by said timepiece mechanism and having an end portion extending radially beyond said clock face portion, the dial having two circumferential bands arranged radially outward with respect to said clock face portion and in spaced relationship to each other, and indicator elements on the outer end portion of the second hand movable over said bands.

2. A display apparatus comprising a casing having spaced front and back walls, a timepiece mechanism in the casing, a dial in the casing intermediate and spaced from said walls, said dial having a clock face portion, the timepiece having minute and hour hands movable over said clock face portion in designating time, a second hand actuated by said timepiece mechanism and having an end portion extending radially beyond said clock face portion, the dial having two circumferential bands arranged radially outward with respect to said clock face portion and in spaced relationship to each other, said second hand being movable over said bands, one of said bands having means indicating feet per second travelled, and the other band having means indicating different periods of time in terms of seconds.

3. A display apparatus comprising a casing having spaced front and back walls, a timepiece mechanism in the casing, a dial in the casing intermediate and spaced from said walls, said dial having a clock face portion, the timepiece having minute and hour hands movable over said clock face portion in designating time, a second hand actuated by said timepiece mechanism and having an end portion extending radially beyond said clock face portion, the dial having two circumferential bands arranged radially outward with respect to said clock face portion and in spaced relationship to each other, indicator elements on the outer end portion of the second hand movable over said bands, one of said bands having means indicating feet per second travelled, the other band having means indicating different periods of time in terms of seconds, and said dial having means intermediate the bands for detachably supporting characterized segments therein.

4. A display apparatus comprising a casing having spaced front and back walls, a timepiece mechanism in the casing, a dial in the casing intermediate and spaced from said walls, said dial having a clock face portion, the timepiece having minute and hour hands movable over said clock face portion in designating time, a second hand actuated by said timepiece mechanism and having an end portion extending radially beyond said clock face portion, the dial having two circumferential bands arranged radially outward with respect to said clock face portion and in spaced relationship to each other, indicator elements on the outer end portion of the second hand movable over said bands, one of said bands having means indicating feet per second travelled, the other band having means indicating different periods of time in terms of seconds, said dial having means intermediate the bands for detachably supporting characterized segments therein, and said dial having other means for supporting characterized segments thereon.

5. The combination with a timepiece mechanism having a time indicating dial, means to convert one to seven o'clock characters of the dial to indicate ten to seventy miles per hour travel of a vehicle, means including a second hand of the timepiece travelling in close proximity to said dial to indicate, in seconds, the period of time required to stop a vehicle when travelling at predetermined miles per hour at the time that the brakes are applied, said last named means comprising a circumferentially arranged band, and circumferentially spaced marked sections on said band.

6. The combination with a timepiece mechanism having a time indicating dial, means to convert one to seven o'clock characters of the dial to indicate ten to seventy miles per hour travel of a vehicle, means including a second hand of the timepiece travelling in close proximity to said dial to indicate, in seconds, the period of time required to stop a vehicle when travelling at predetermined miles per hour at the time that the brakes are applied, said last named means comprising a circumferentially arranged band, an indicating element on the second hand travelling over said band, means comprising another band, an element on the second hand movable over said second band to indicate the feet per second travelled of a vehicle at said indicated miles per hour travel of a vehicle and means for detachably supporting characterized members in close proximity to said dial.

7. The combination with a timepiece having minute and hour hands, of a second hand mounted for actuation by said timepiece, said second hand being composed of transparent material, and the outer end portion of said second hand having longitudinally spaced characterized opaque elements.

8. In apparatus of the class described, a dial plate, said plate having, at the central portion thereof, a time indicating band, the plate, outwardly of said band and inwardly of marginal edges of the plate, having a curved recess concentric to said band, said recess providing means for detachably supporting characterized members on the plate flush with the surface of said plate, and said curved recess having sections of different radial dimensions.

9. A timepiece mechanism having a circumferential time indicating dial, a portion of said dial having a predetermined arrangement of numerals arranged thereon to indicate ten to seventy miles per hour travel of a vehicle, a circumferentially arranged band paralleling said portion of the dial, said band having circumferentially spaced sections marked to indicate, in seconds, the period of time required to stop a vehicle, when the brakes are applied at the miles per hour designated by said dial portion, and a second hand operated by said mechanism and movable over said band.

HUGH V. CONROY.

REFERENCES CITED

The following references are of record in the file of this patent:

UNITED STATES PATENTS

| Number | Name | Date |
|---|---|---|
| 1,851,824 | Fewell | Mar. 29, 1932 |
| 2,027,006 | Thomas | Jan. 7, 1936 |
| 2,015,502 | Swigert, Jr. | Aug. 18, 1936 |
| 2,163,616 | McGihon | June 27, 1939 |
| 2,282,209 | Pepper, Jr., et al. | May 5, 1942 |
| 2,329,079 | Pritchett | Sept. 7, 1943 |